(12) United States Patent
Clifford

(10) Patent No.: US 10,960,827 B1
(45) Date of Patent: Mar. 30, 2021

(54) ERGONOMIC ACCESS PERSONAL BULLET-PROOF SHIELD STOWAGE DEVICE

(71) Applicant: Carl Clifford, Murrieta, CA (US)

(72) Inventor: Carl Clifford, Murrieta, CA (US)

( * ) Notice: Subject to any disclaimer, the term of this patent is extended or adjusted under 35 U.S.C. 154(b) by 0 days.

(21) Appl. No.: 16/949,733

(22) Filed: Nov. 12, 2020

(51) Int. Cl.
*F41H 5/013* (2006.01)
*F41H 5/08* (2006.01)
*B60R 21/12* (2006.01)
*B60R 11/00* (2006.01)

(52) U.S. Cl.
CPC .............. *B60R 11/00* (2013.01); *B60R 21/12* (2013.01); *F41H 5/013* (2013.01); *F41H 5/08* (2013.01); *B60R 2011/0026* (2013.01); *B60R 2011/0059* (2013.01); *B60R 2011/0066* (2013.01)

(58) Field of Classification Search
CPC . F41H 5/08; F41H 5/013; F41H 5/263; B60R 2011/0026; B60R 2011/0059; B60R 21/12
See application file for complete search history.

(56) References Cited

U.S. PATENT DOCUMENTS

| | | | | |
|---|---|---|---|---|
| 3,923,339 | A * | 12/1975 | McDonald | F41H 5/226 296/95.1 |
| 4,345,147 | A | 8/1982 | Aaron et al. | |
| 5,271,311 | A * | 12/1993 | Madden, Jr. | B60R 21/12 89/36.02 |
| 5,370,035 | A * | 12/1994 | Madden, Jr. | B60R 21/12 109/49.5 |
| 5,533,778 | A * | 7/1996 | Sheridan | F41H 5/226 296/152 |
| 5,570,542 | A * | 11/1996 | Cameron | B60J 1/2011 160/105 |
| 5,811,719 | A * | 9/1998 | Madden, Jr. | B60R 21/12 296/146.7 |
| 6,394,530 | B1 * | 5/2002 | Bittner | B60J 1/2011 160/370.21 |
| 6,647,857 | B1 * | 11/2003 | Newkirk | F41H 5/08 296/97.3 |
| 7,114,760 | B2 * | 10/2006 | Cameron | B60J 1/20 296/152 |
| 8,500,186 | B2 * | 8/2013 | Warren | F41H 5/06 296/97.5 |
| 9,211,848 | B2 | 12/2015 | Murray et al. | |
| 9,651,340 | B1 * | 5/2017 | Tunis, III | E06B 5/10 |
| 9,944,217 | B2 | 4/2018 | Schroeder et al. | |
| 10,001,347 | B2 * | 6/2018 | Tunis, III | E06B 5/10 |

(Continued)

*Primary Examiner* — Justin M Larson
(74) *Attorney, Agent, or Firm* — Carson Patent®; Gregory D. Carson

(57) ABSTRACT

The Ergonomic Access Personal Bullet-Proof Shield Stowage Device comprises a nearly transparent articulable plurality of tension positioned suspended support arms having auto body window sill securing clips, and shield position retention securing clips seated between and connectively attached to an upper and a lower auto window frame for the purpose of enabling the suspension and stowage of a bullet-proof or bullet-resistant shield for immediate/urgent ergonomic access by a passenger when exiting a passenger vehicle. The Ergonomic Access Personal Bullet-Proof Shield Stowage Device may alternatively be used in any window with an upper and lower sill whereupon to position the window sill securing clips.

16 Claims, 2 Drawing Sheets

(56) References Cited

U.S. PATENT DOCUMENTS

| | | | |
|---|---|---|---|
| 10,006,744 B2 * | 6/2018 | Wibby | B32B 27/283 |
| 10,352,659 B2 * | 7/2019 | Tunis, III | E06B 9/00 |
| 10,352,660 B2 * | 7/2019 | Trott | F41H 5/08 |
| 10,611,268 B2 | 4/2020 | Jackson et al. | |
| D887,926 S * | 6/2020 | Martin | F41H 5/263 |
| | | | D12/182 |
| 10,718,594 B2 * | 7/2020 | Trott | B60J 1/085 |
| 2005/0050812 A1 * | 3/2005 | Cameron | B60J 1/20 |
| | | | 52/204.1 |
| 2017/0043873 A1 * | 2/2017 | Held-Sheehe | F41H 5/08 |
| 2017/0115099 A1 * | 4/2017 | Tunis, III | F41H 5/0407 |
| 2018/0149449 A1 * | 5/2018 | Trudeau | B32B 27/34 |
| 2018/0202772 A1 * | 7/2018 | Martin | F41H 5/263 |
| 2020/0348109 A1 * | 11/2020 | Trott | F41H 5/226 |

\* cited by examiner

ERGONOMIC ACCESS PERSONAL BULLET-PROOF SHIELD STOWAGE DEVICE

TECHNICAL FIELD OF THE INVENTION

This invention relates generally to an Ergonomic Access Personal Bullet-Proof Shield Stowage Device in the form of a nearly transparent articulable plurality of tension positioned suspended support arms having auto body securing clips and shield securing clips seated between and connectively attached to an upper and a lower auto window frame for the purpose of enabling the suspension and stowage of a bullet proof shield for immediate ergonomic access by a passenger when exiting a passenger vehicle.

BACKGROUND OF THE INVENTION

Today, many military, police, and security personnel operate (function in their job) from a passenger vehicle. All too frequently, the military, police, and security personnel are in situations wherein a bullet-proof shield becomes a vital piece of equipment. A personal sized bullet-proof (bullet-resistant) shield of a quarter of a square meter is sufficient when held at arms length in the direction of gunfire (potential gunfire) can enable the protection of an operator's upper torso, arms, hands, and head.

In searching for a personal sized bullet-proof (bullet-resistant) shield that is immediately and urgently available and ergonomically accessible at the point of need (upon exiting from a passenger vehicle), there is nothing available today. There are bullet-proof and bullet-resistant shields of various sizes made from many forms and formulations of plexiglass so as to be transparent, but there are none that include the capability to mount and store a personal sized shield in close proximity to and in a position so as to be immediately accessible upon exiting from a passenger vehicle. Today, while it is possible to get a personal sized shield that is transparent, and keep it on a seat, a seat pocket, or a door pocket, this simply is not ergonomic, or convenient to access at the time of need, when exiting a passenger vehicle.

Military, police, and security personnel operating from passenger vehicles all too frequently need to immediately and effectively protect themselves from gunfire and potential gunfire. If there were a transparent, personal sized, bullet-proof or bullet resistant shield attached to the surface of a door of their passenger vehicle, military, police, and security personnel would have access to and the capability to use the shield for protection even suddenly when exiting a passenger vehicle or when standing by the passenger vehicle with the door open where a shield is stowed.

In light of the foregoing prior art, there is a need for a transparent shield held in an immediately and ergonomically accessible location that military, police, and security personnel can easily and readily grab when exiting a passenger vehicle.

BRIEF SUMMARY OF THE INVENTION

According to a first aspect of the invention, there is an Ergonomic Access Personal Bullet-Proof Shield Stowage Device for stowing a transparent bullet-proof shield in an ergonomically accessible position within a window frame comprising a set of two support arms having an upper end and a lower end wherein said upper end comprises an upper window sill clip and said lower end comprises a lower window sill clip and the support arms comprise an upper telescoping arm having an internally nested lower telescoping arm, and an internal spring connectively attached between said upper telescoping arm and said lower telescoping arm enabling a tension force to maintain said shield stowage device in a placed position between an upper window sill and a lower window sill with said support arms having an upper shield position retention clip connectively attached proximally to said upper window sill clip and a lower shield position retention clip having a lower spring tensioner connectively attached proximally and between said lower shield position retention clip and said lower window sill clip wherein said upper shield position retention clips and said lower shield position retention clips are separated vertically by a height eighty to ninety-eight percent a height of a transparent bullet-proof shield enabling the suspension and stowage of a transparent bullet-proof shield positioned for immediate ergonomic access between said upper window sill and said lower window sill resting upon and secured between said upper shield position retention clips and said lower shield position retention clips wherein said transparent bullet-proof shield is held in position by depression of said lower shield position retention clip thereby depressing said lower spring tensioner whose tension thereby holds in position said transparent bullet-proof shield between said upper shield position retention clips and said lower position retention shield clips enabling immediate ergonomic access by pulling said transparent bullet-proof shield out and away from said shield stowage device.

According to a second aspect of the invention, there is another Ergonomic Access Personal Bullet-Proof Shield Stowage Device for ergonomic access of a transparent bullet-proof shield stowed between said upper shield position retention clips and said lower shield position retention clips wherein said upper window sill and said lower window sill are parts of a window sill of a driver's-side door of a passenger vehicle.

According to a third aspect of the invention, there is another Ergonomic Access Personal Bullet-Proof Shield Stowage Device for ergonomic access of a transparent bullet-proof shield stowed between said upper shield position retention clips and said lower shield position retention clips wherein said upper window sill and said lower window sill are parts of a window sill of a passenger's-side door of a passenger vehicle.

According to a fourth aspect of the invention, there is another Ergonomic Access Personal Bullet-Proof Shield Stowage Device wherein said internal spring is embodied by a pneumatic tensioning apparatus.

According to a fifth aspect of the invention, there is another Ergonomic Access Personal Bullet-Proof Shield Stowage Device for ergonomic access of a transparent bullet-proof shield stowed between said upper shield position retention clips and said lower shield position retention clips wherein said upper window sill and said lower window sill are parts of a window sill of a driver's-side door of a passenger vehicle, and wherein said internal spring is embodied by a pneumatic tensioning apparatus.

According to a sixth aspect of the invention, there is another Ergonomic Access Personal Bullet-Proof Shield Stowage Device for ergonomic access of a transparent bullet-proof shield stowed between said upper shield position retention clips and said lower shield position retention clips wherein said upper window sill and said lower window sill are parts of a window sill of a passenger's-side door of a passenger vehicle, and wherein said internal spring is embodied by a pneumatic tensioning apparatus.

According to a seventh aspect of the invention, there is another Ergonomic Access Personal Bullet-Proof Shield Stowage Device wherein said lower spring tensioner is embodied by a pneumatic tensioning apparatus.

According to an eighth aspect of the invention, there is another Ergonomic Access Personal Bullet-Proof Shield Stowage Device for ergonomic access of a transparent bullet-proof shield stowed between said upper shield position retention clips and said lower shield position retention clips wherein said upper window sill and said lower window sill are parts of a window sill of a driver's-side door of a passenger vehicle, and wherein said lower spring tensioner is embodied by a pneumatic tensioning apparatus.

According to a ninth aspect of the invention, there is another Ergonomic Access Personal Bullet-Proof Shield Stowage Device for ergonomic access of a transparent bullet-proof shield stowed between said upper shield position retention clips and said lower shield position retention clips wherein said upper window sill and said lower window sill are parts of a window sill of a passenger's-side door of a passenger vehicle, and wherein said lower spring tensioner is embodied by a pneumatic tensioning apparatus.

According to a tenth aspect of the invention, there is another Ergonomic Access Personal Bullet-Proof Shield Stowage Device wherein said internal spring is embodied by a pneumatic tensioning apparatus, and said lower spring tensioner is embodied by a pneumatic tensioning apparatus.

According to an eleventh aspect of the invention, there is another Ergonomic Access Personal Bullet-Proof Shield Stowage Device for ergonomic access of a transparent bullet-proof shield stowed between said upper shield position retention clips and said lower shield position retention clips wherein said upper window sill and said lower window sill are parts of a window sill of a driver's-side door of a passenger vehicle, wherein said internal spring is embodied by a pneumatic tensioning apparatus, and said lower spring tensioner is embodied by a pneumatic tensioning apparatus.

According to a twelfth aspect of the invention, there is another Ergonomic Access Personal Bullet-Proof Shield Stowage Device for ergonomic access of a transparent bullet-proof shield stowed between said upper shield position retention clips and said lower shield position retention clips wherein said upper window sill and said lower window sill are parts of a window sill of a passenger's-side door of a passenger vehicle, wherein said internal spring is embodied by a pneumatic tensioning apparatus, and said lower spring tensioner is embodied by a pneumatic tensioning apparatus.

According to a thirteenth aspect of the invention, there is another Ergonomic Access Personal Bullet-Proof Shield Stowage Device wherein there are three or a plurality of support arms.

An advantage of the present invention is the immediate and ergonomically positioned placement of a transparent bullet-proof or bullet-resistant personal sized shield.

The invention will now be described, by way of example only, with reference to the accompanying drawings in which:

DETAILED DESCRIPTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Figure 1:
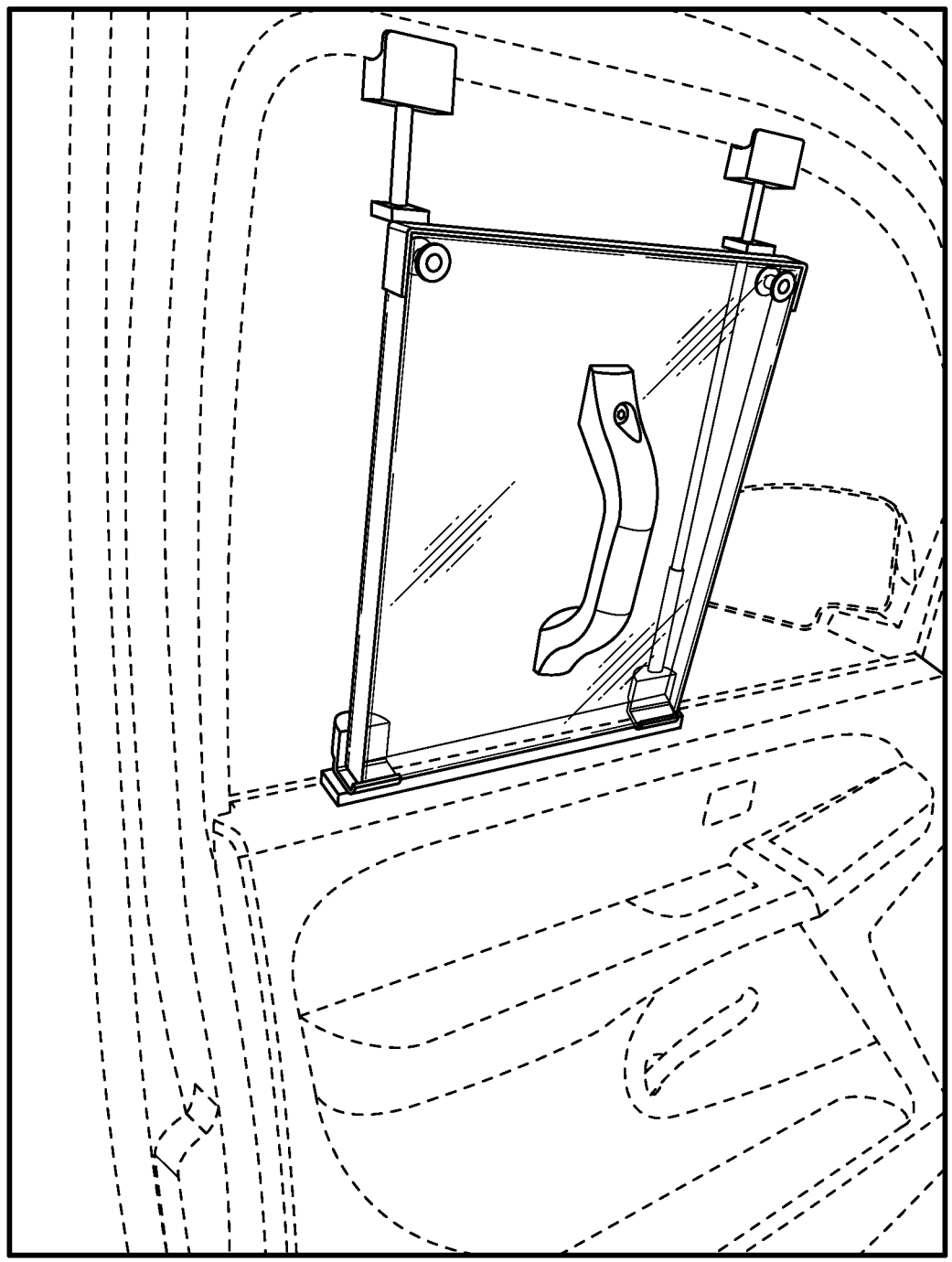
FIG. 1 is a perspective view of a transparent bullet-proof shield being held in a passenger vehicle window frame embodiment according to the invention.
Figure 2:
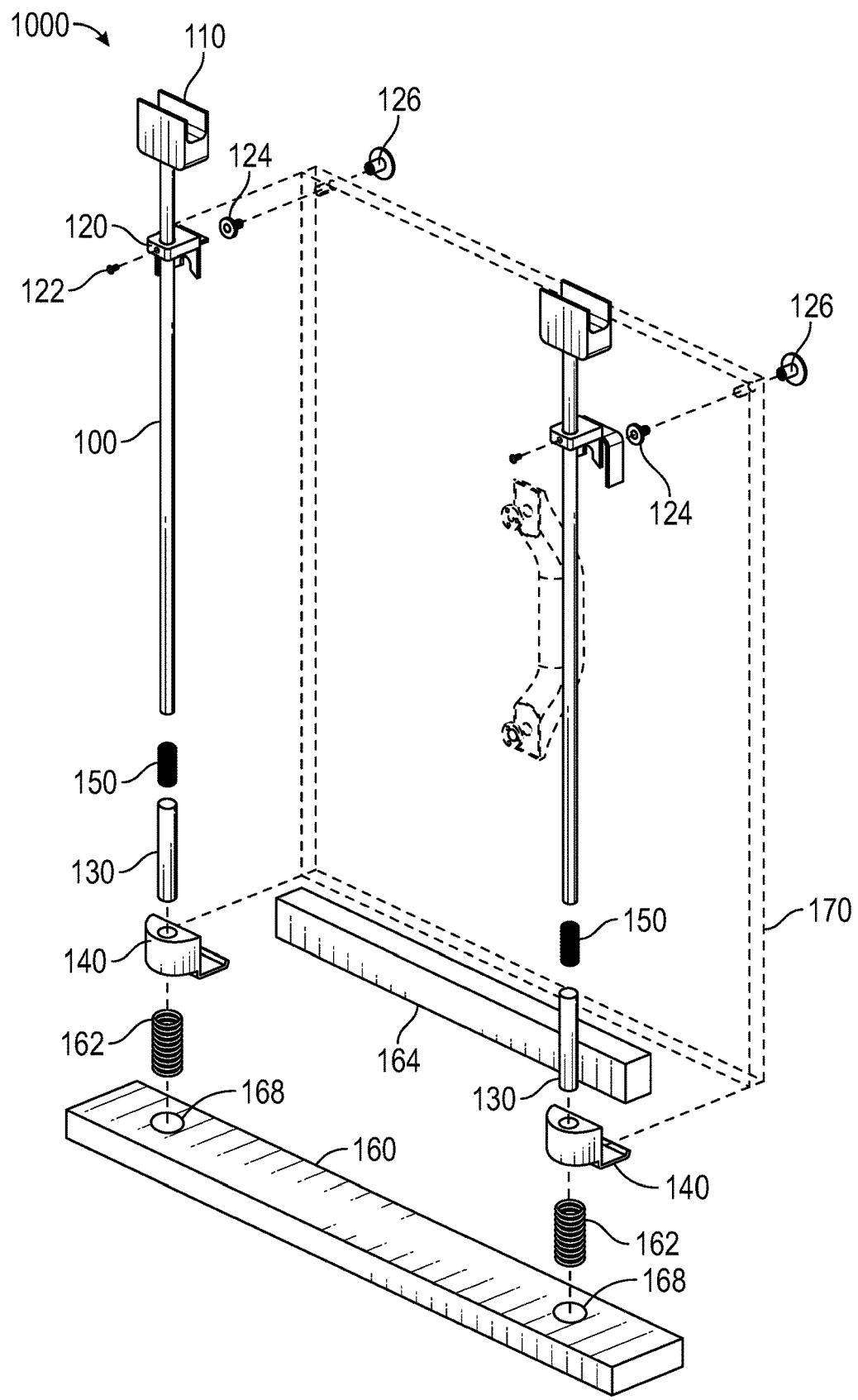
FIG. 2 is an exploded perspective view showing the main elements of an embodiment according to the invention. The broken lines in FIG. 2 show a transparent bullet-proof shield in the background.

Referring to the Figures, there is shown in FIG. 2, Element 1000, which is a shield stowage device.

Index of Labelled Elements in Figures (in numeric order):

Element 100 is an upper telescoping arm.
Element 110 is an upper window sill clip.
Element 120 is an upper shield position retention clip.
Element 122 is an upper shield clip position retention set screw.
Element 124 is an upper corner shield position ring.
Element 126 is an upper corner shield position ring set screw.
Element 130 is a lower telescoping arm.
Element 140 is a lower shield position retention clip.
Element 150 is an internal spring.
Element 160 is a lower window sill clip.
Element 162 is a lower spring tensioner.
Element 164 is a lower shield clip retention device/apparatus.
Element 168 is a lower telescoping arm positioning hole.
Element 170 is a transparent bullet-proof shield, shown in broken lines.

In an preferred embodiment of the invention, there is an Ergonomic Access Personal Bullet-Proof Shield Stowage Device (1000) for stowing a transparent bullet-proof shield (170) in an ergonomically accessible position within a window frame comprising a set of two support arms (the combination of 120, 150, and 140) having an upper end and a lower end wherein said upper end comprises an upper window sill clip and said lower end comprises a lower window sill clip said support arms (120, 150, and 140) comprise an upper telescoping arm (100) having an internally nested lower telescoping arm (130), and an internal spring (150) connectively attached between said upper telescoping arm (100) and said lower telescoping arm (130) enabling a tension force to maintain said shield stowage device (1000) in a placed position between an upper window sill and a lower window sill and said support arms (120, 150, and 140) having an upper shield position retention clip (120) connectively attached proximally to said upper window sill clip (110) and a lower shield position retention clip (140) having a lower spring tensioner (162) connectively attached proximally and between said lower shield position retention clip (140) and said lower window sill clip (160) wherein said upper shield position retention clips (120) and said lower shield position retention clips (140) are separated vertically by a height eighty to ninety-eight percent a height of a transparent bullet-proof shield (170) enabling the suspension and stowage of a transparent bullet-proof shield (170) positioned for immediate ergonomic access between said upper window sill and said lower window sill resting upon and secured between said upper shield position retention clips (120) and said lower shield position retention clips (140) wherein said transparent bullet-proof shield is held in position by depression of said lower shield position retention clip (140) thereby depressing said lower spring tensioner (162) whose tension thereby holds in position said transparent bullet-proof shield (170) between said upper shield position retention clips (120) and said lower shield position retention clips (140) enabling immediate ergonomic access by pulling said transparent bullet-proof shield (170) out and away from said shield stowage device (1000).

In an embodiment of the invention, there is another Ergonomic Access Personal Bullet-Proof Shield Stowage Device (1000) for ergonomic access of a transparent bullet-proof shield (170) stowed between said upper shield position retention clips (120) and said lower shield position retention clips (140) wherein said upper window sill and said lower window sill are parts of a window sill of a driver's-side door of a passenger vehicle.

In an embodiment of the invention, there is another Ergonomic Access Personal Bullet-Proof Shield Stowage Device (1000) for ergonomic access of a transparent bullet-proof shield (170) stowed between said upper shield position retention clips (120) and said lower shield position retention clips (140) wherein said upper window sill and said lower window sill are parts of a window sill of a passenger's-side door of a passenger vehicle.

In an embodiment of the invention, there is another Ergonomic Access Personal Bullet-Proof Shield Stowage Device (1000) for ergonomic access of a transparent bullet-proof shield (170) stowed between said upper shield position retention clips (120) and said lower shield position retention clips (140) wherein said internal spring (150) is embodied by a pneumatic tensioning apparatus.

In an embodiment of the invention, there is another Ergonomic Access Personal Bullet-Proof Shield Stowage Device (1000) for ergonomic access of a transparent bullet-proof shield (170) stowed between said upper shield position retention clips (120) and said lower shield position retention clips (140) wherein said upper window sill and said lower window sill are parts of a window sill of a driver's-side door of a passenger vehicle, and wherein said internal spring is embodied by a pneumatic tensioning apparatus.

In an embodiment of the invention, there is another Ergonomic Access Personal Bullet-Proof Shield Stowage Device (1000) for ergonomic access of a transparent bullet-proof shield (170) stowed between said upper shield position retention clips (120) and said lower shield position retention clips (140) wherein said upper window sill and said lower window sill are parts of a window sill of a passenger's-side door of a passenger vehicle, and wherein said internal spring (150) is embodied by a pneumatic tensioning apparatus.

In an embodiment of the invention, there is another Ergonomic Access Personal Bullet-Proof Shield Stowage Device (1000) for ergonomic access of a transparent bullet-proof shield (170) stowed between said upper shield position retention clips (120) and said lower shield position retention clips (140) wherein said lower spring tensioner is embodied by a pneumatic tensioning apparatus.

In an embodiment of the invention, there is another Ergonomic Access Personal Bullet-Proof Shield Stowage Device (1000) for ergonomic access of a transparent bullet-proof shield (170) stowed between said upper shield position retention clips (120) and said lower shield position retention clips (140) wherein said upper window sill and said lower window sill are parts of a window sill of a driver's-side door of a passenger vehicle, and wherein said lower spring tensioner (162) is embodied by a pneumatic tensioning apparatus.

In an embodiment of the invention, there is another Ergonomic Access Personal Bullet-Proof Shield Stowage Device (1000) for ergonomic access of a transparent bullet-proof shield (170) stowed between said upper shield position retention clips (120) and said lower shield position retention clips (140) wherein said upper window sill and said lower window sill are parts of a window sill of a passenger's-side door of a passenger vehicle, and wherein said lower spring tensioner (162) is embodied by a pneumatic tensioning apparatus.

In an embodiment of the invention, there is another Ergonomic Access Personal Bullet-Proof Shield Stowage Device (1000) wherein said internal spring (150) is embodied by a pneumatic tensioning apparatus, and said lower spring tensioner (162) is embodied by a pneumatic tensioning apparatus.

In an embodiment of the invention, there is another Ergonomic Access Personal Bullet-Proof Shield Stowage Device (1000) for ergonomic access of a transparent bullet-proof shield stowed between said upper shield position retention clips (120) and said lower shield position retention clips (140) wherein said upper window sill and said lower window sill are parts of a window sill of a driver's-side door of a passenger vehicle, wherein said internal spring (150) is embodied by a pneumatic tensioning apparatus, and said lower spring tensioner (162) is embodied by a pneumatic tensioning apparatus.

In an embodiment of the invention, there is another Ergonomic Access Personal Bullet-Proof Shield Stowage Device (1000) for ergonomic access of a transparent bullet-proof shield stowed between said upper shield position retention clips (120) and said lower shield position retention clips (140) wherein said upper window sill and said lower window sill are parts of a window sill of a passenger's-side door of a passenger vehicle, wherein said internal spring is embodied by a pneumatic tensioning apparatus, and said lower spring tensioner is embodied by a pneumatic tensioning apparatus.

In an embodiment of the invention, there is another Ergonomic Access Personal Bullet-Proof Shield Stowage Device (1000) for ergonomic access of a transparent bullet-proof shield stowed between said upper shield position retention clips (120) and said lower shield position retention clips (140) wherein there are three or a plurality of support arms (120, 150, and 140).

In an embodiment, the upper shield position retention clips (120) and the lower shield position retention clips (140) can be generic in shape and fit for slipping between the glass in a window and any seal adjacent or proximal thereto for a generic or general window, or general size and dimension so as to be adjustable for a wide range of window sizes. In an alternate embodiment, the upper shield position retention clips (120) and the lower shield position retention clips (140) can be customized in shape and fit for slipping between the glass in a window and any seal adjacent or proximal thereto for a particular window, or particular window in a particular passenger vehicle. In an alternate embodiment, it is noted that the upper shield position retention clips (120) and the lower shield position retention clips (140) can be customized in shape and fit for slipping between the glass in a window and any seal adjacent or proximal thereto for a particular window, or particular window in a particular passenger vehicle and installed as by the manufacturer during manufacturer of a passenger vehicle.

In an alternate embodiment, the transparent bullet-proof, or bullet-resistant personal sized shield (170), has magnetic connectors connectively attached to the corners of said shield (170), and the upper shield position retention clips (120) and the lower shield position retention clips (140) have the mated magnetic connectors attached to, or integrated into, the front (shield) facing side of the upper shield position retention clips (120) and the lower shield position retention clips (140) so as to enable the shield (170) to magnetically attach to the shield stowage device (1000).

In an embodiment of the invention, the upper shield position retention clips (120) are integrated into the upper end of the upper telescoping arm, and the lower shield position retention clips (140) are integrated into the lower telescoping arm. In an alternate embodiment, the upper shield position retention clips (120) and the lower shield position retention clips (140) are embodied with ring retention clip seats and the transparent bullet-proof shield (170) comprises rings for seating into the ring retention clip seats incorporated into and/or connectively attached to the upper shield position retention clips (120) and the lower shield position retention clips (140).

In an embodiment of the invention, the amount of force available to hold the support arms (120, 150, and 140) in position once placed into position is adjustable by changing the spring composition, material, and/or coiling force so as to enable a larger or smaller spring tension force. In embodiments where the tension force to hold the support arms (120, 150, and 140) in position once placed in position is enabled by pneumatic actuators/tensioners, the force of tension to hold is adjustable either by controlling the pneumatic actuator/tensioner directly with its associated controller, and/or by adjusting the size and strength of the pneumatic actuator/tensioner selected for use in an alternate embodiment.

In an embodiment of the invention, the amount of force available to hold to transparent bullet-proof or bullet-resistant personal sized shield (170) in position once placed into position is adjustable by changing the spring composition, material, and/or coiling force so as to enable a larger or smaller spring tension force. In embodiments where the tension force to hold the support arms (120, 150, and 140) in position once placed in position is enabled by pneumatic actuators/tensioners, the force of tension to hold is adjustable either by controlling the pneumatic actuator/tensioner directly with its associated controller, and/or by adjusting the size and strength of the pneumatic actuator/tensioner selected for use in an alternate embodiment.

An advantage of the present invention is the immediate and ergonomically positioned placement of a transparent bullet-proof or bullet-resistant personal sized shield (170). It is rapidly deployable, rapidly re-stowable, and encourages increased frequency of use as a result of its convenient, easy, ergonomic deployable positioned access location. In a preferred embodiment of the invention, the transparent bullet-proof or bullet-resistant personal sized shield (170) is placed proximal to the door opening side of the window of a passenger vehicle thereby perfectly positioning a handle of a shield (170) adjacent to a shoulder, arm, and hand of an exiting passenger so as to enable nearly accidental, and/or the purposeful immediate extraction of a shield (170) thereby enabling convenience and ease of use thereby encouraging use and potentially saving the life of a military, police, or security person.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. An Ergonomic Access Personal Bullet-Proof Shield Stowage Device for stowing a transparent bullet-proof shield in an ergonomically accessible position within a window frame comprising a plurality of support arms having an upper end and a lower end wherein said upper end comprises an upper window sill clip and said lower end comprises a lower window sill clip and the support arms comprise an upper telescoping arm having an internally nested lower telescoping arm, and an internal spring connectively attached between said upper telescoping arm and said lower telescoping arm enabling a tension force to maintain said shield stowage device in a placed position between an upper window sill and a lower window sill with said support arms having an upper shield position retention clip connectively attached proximally to said upper window sill clip and a lower shield position retention clip having a lower spring tensioner connectively attached proximally and between said lower shield position retention clip and said lower window sill clip wherein said upper shield position retention clips and said lower shield position retention clips are separated vertically by a height eighty to ninety-eight percent a height of a transparent bullet-proof shield enabling the suspension and stowage of a transparent bullet-proof shield positioned for immediate ergonomic access between said upper window sill and said lower window sill resting upon and secured between said upper shield position retention clips and said lower shield position retention clips wherein said transparent bullet-proof shield is held in position by depression of said lower shield position retention clip thereby depressing said lower spring tensioner whose tension thereby holds in position said transparent bullet-proof shield between said upper shield position retention clips and said lower shield position retention clips enabling immediate ergonomic access by pulling said transparent bullet-proof shield out and away from said shield stowage device.

2. The apparatus of claim 1 for ergonomic access of a transparent bullet-proof shield stowed between said upper shield position retention clips and said lower shield position retention clips wherein said upper window sill and said lower window sill are parts of a driver's-side door of a passenger vehicle.

3. The apparatus of claim 1 for ergonomic access of a transparent bullet-proof shield stowed between said upper shield position retention clips and said lower shield position retention clips wherein said upper window sill and said lower window sill are parts of a passenger's-side door of a passenger vehicle.

4. The apparatus of claim 1 wherein said internal spring is embodied by a pneumatic tensioning apparatus.

5. The apparatus of claim 1 for ergonomic access of a transparent bullet-proof shield stowed between said upper shield position retention clips and said lower shield position retention clips wherein said upper window sill and said lower window sill are parts of a driver's-side door of a passenger vehicle, and wherein said internal spring is embodied by a pneumatic tensioning apparatus.

6. The apparatus of claim 1 for ergonomic access of a transparent bullet-proof shield stowed between said upper shield position retention clips and said lower shield position retention clips wherein said upper window sill and said lower window sill are parts of a passenger's-side door of a passenger vehicle, and wherein said internal spring is embodied by a pneumatic tensioning apparatus.

7. The apparatus of claim 1 wherein said lower spring tensioner is embodied by a pneumatic tensioning apparatus.

8. The apparatus of claim 1 for ergonomic access of a transparent bullet-proof shield stowed between said upper shield position retention clips and said lower shield position retention clips wherein said upper window sill and said lower window sill are parts of a driver's-side door of a passenger vehicle, and wherein said lower spring tensioner is embodied by a pneumatic tensioning apparatus.

9. The apparatus of claim 1 for ergonomic access of a transparent bullet-proof shield stowed between said upper shield position retention clips and said lower shield position retention clips wherein said upper window sill and said lower window sill are parts of a passenger's-side door of a passenger vehicle, and wherein said lower spring tensioner is embodied by a pneumatic tensioning apparatus.

10. The apparatus of claim 1 wherein said internal spring is embodied by a pneumatic tensioning apparatus, and said lower spring tensioner is embodied by a pneumatic tensioning apparatus.

11. The apparatus of claim 1 for ergonomic access of a transparent bullet-proof shield stowed between said upper shield position retention clips and said lower shield position retention clips wherein said upper window sill and said lower window sill are parts of a window sill of a driver's-side door of a passenger vehicle, wherein said internal spring is embodied by a pneumatic tensioning apparatus, and said lower spring tensioner is embodied by a pneumatic tensioning apparatus.

12. The apparatus of claim 1 for ergonomic access of a transparent bullet-proof shield stowed between said upper shield position retention clips and said lower shield position retention clips wherein said upper window sill and said lower window sill are parts of a window sill of a passenger's-side door of a passenger vehicle, wherein said internal spring is embodied by a pneumatic tensioning apparatus, and said lower spring tensioner is embodied by a pneumatic tensioning apparatus.

13. An Ergonomic Access Personal Bullet-Proof Shield Stowage Device for stowing a transparent bullet-proof shield in an ergonomically accessible position within a window frame comprising a plurality of support arms having an upper end and a lower end wherein said upper end comprises an upper window sill clip and said lower end comprises a lower window sill clip and the support arms comprise an upper telescoping arm having an internally nested lower telescoping arm, and an internal spring connectively attached between said upper telescoping arm and said lower telescoping arm enabling a tension force to maintain said shield stowage device in a placed position between an upper window sill and a lower window sill with said support arms having an upper shield position retention clip connectively attached proximally to said upper window sill clip and a lower shield position retention clip having a lower spring tensioner connectively attached proximally and between said lower shield position retention clip and said lower window sill clip and a shield support bar connectively attached to two or more of said lower shield position retention clips wherein said upper shield position retention clips and said lower shield position retention clips are separated vertically by a height eighty to ninety-eight percent a height of a transparent bullet-proof shield enabling the suspension and stowage of a transparent bullet-proof shield positioned for immediate ergonomic access between said upper window sill and said shield support bar resting upon and secured between said upper shield position retention clips and said shield support bar wherein said transparent bullet-proof shield is held in position by depression of said shield support bar thereby depressing said lower shield position retention clip thereby depressing said lower spring tensioner whose tension thereby holds in position said transparent bullet-proof shield between said upper shield position retention clips and said shield support bar enabling immediate ergonomic access by pulling said transparent bullet-proof shield out and away from said shield stowage device.

14. The apparatus of claim 13 wherein said internal spring is embodied by a pneumatic tensioning apparatus.

15. The apparatus of claim 13 wherein said lower spring tensioner is embodied by a pneumatic tensioning apparatus.

16. The apparatus of claim 13 wherein said internal spring is embodied by a pneumatic tensioning apparatus, and said lower spring tensioner is embodied by a pneumatic tensioning apparatus.

\* \* \* \* \*